United States Patent
Gates et al.

(10) Patent No.: US 7,059,639 B2
(45) Date of Patent: Jun. 13, 2006

(54) SPACED-APART HOOD LATCH CABLE RETAINING SYSTEM

(75) Inventors: Lee Bettencourt Gates, Dublin, OH (US); Patrick Joesph Ellison, Columbus, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,086

(22) Filed: Aug. 16, 2002

(65) Prior Publication Data

US 2004/0032129 A1 Feb. 19, 2004

(51) Int. Cl.
*E05C 19/10* (2006.01)

(52) U.S. Cl. ............... 292/125; 292/141; 292/171; 292/225; 74/502.4; 74/502.6

(58) Field of Classification Search ............ 292/125, 292/216, 133, 225, 235, 141, 171, DIG. 65; 74/502.4, 502.6
See application file for complete search history.

(56) References Cited

U.S. PATENT DOCUMENTS

| 2,286,736 | A | * | 6/1942 | Rowland et al. | 292/171 |
| 3,955,441 | A | * | 5/1976 | Johnson | 74/502.4 |
| 4,456,289 | A | * | 6/1984 | Badiali | 292/28 |
| 4,585,258 | A |   | 4/1986 | Mochida | 292/125 |
| 4,738,155 | A | * | 4/1988 | Stocker | 74/502.6 |
| 4,756,562 | A | * | 7/1988 | Foster et al. | 292/28 |
| 4,836,591 | A | * | 6/1989 | Faust | 292/336.3 |
| 4,917,418 | A | * | 4/1990 | Gokee | 292/125 |
| 4,955,458 | A | * | 9/1990 | Shellhause | 188/2 D |
| 4,961,601 | A |   | 10/1990 | Lindholm et al. | 292/216 |
| 4,967,987 | A | * | 11/1990 | Swank | 248/68.1 |
| 5,156,063 | A | * | 10/1992 | Kelley | 74/501.5 R |
| 5,188,425 | A | * | 2/1993 | Foster et al. | 297/473 |
| 5,431,460 | A |   | 7/1995 | Hass et al. | 292/216 |
| 5,461,938 | A | * | 10/1995 | Froling et al. | 74/502.4 |
| 5,531,489 | A | * | 7/1996 | Cetnar | 292/225 |
| 5,553,818 | A | * | 9/1996 | Wild | 248/56 |
| 5,618,069 | A | * | 4/1997 | Konchan et al. | 292/216 |
| 5,802,928 | A | * | 9/1998 | Tame | 74/502.4 |
| 5,819,593 | A | * | 10/1998 | Rixon et al. | 74/514 |
| 6,102,453 | A | * | 8/2000 | Cetnar | 292/201 |
| 6,178,845 | B1 | * | 1/2001 | Gutschner | 74/502.4 |
| 6,256,932 | B1 | * | 7/2001 | Jyawook et al. | 49/503 |
| 6,361,091 | B1 | * | 3/2002 | Weschler | 292/336.3 |
| 6,398,271 | B1 | * | 6/2002 | Tomaszewski et al. | 292/216 |
| 6,474,190 | B1 | * | 11/2002 | Choo | 74/502.4 |
| 6,530,251 | B1 | * | 3/2003 | Dimig | 70/237 |

FOREIGN PATENT DOCUMENTS

GB 2139279 A * 11/1984

* cited by examiner

*Primary Examiner*—Brian E. Glessner
*Assistant Examiner*—Carlos Lugo
(74) *Attorney, Agent, or Firm*—Eley Law Firm Co.; Christen Millard

(57) ABSTRACT

A method and apparatus for a hood latch cable retaining system. A cable mounting cavity for a conventional snap-fit cable fastener is provided in a latch support structure of the hood release mechanism. A retainer is mounted to the latch support structure and positioned such that a flange portion of the retainer having a confronting edge is spaced a predetermined distance and offset from the center line of the cable mounting cavity. The latch support structure may be deformed or repositioned during a frontal vehicle impact, causing the confronting edge of the flange to come into contact with the control cable. The confronting edge impedes the snap-fit fastener from disengaging from the latch support structure, preventing the vehicle hood from inadvertently opening.

5 Claims, 3 Drawing Sheets

SPACED-APART HOOD LATCH CABLE RETAINING SYSTEM

FIELD

The inventive embodiments are directed towards a spaced apart retaining system to prevent disengagement of a captive vehicle hood release cable from a hood latch mechanism.

BACKGROUND

Many automobiles are manufactured with a remotely actuated hood release, allowing the driver to unlatch the hood by means of a lever located in the passenger compartment of the automobile. This feature provides a convenient means to release the hood for access to the engine compartment. Such hood release mechanisms typically utilize an actuator control cable assembly consisting of a flexible outer sheath encasing a multi-strand cable wire capable of free coaxial movement within the sheath. The control cable assembly is installed such that the sheath is captively engaged at both ends, typically with snap-fit type fasteners which are mounted near the ends of the sheath portion of the cable and then pressed into a mating hole or slot such that the interior cable wire is movable within the fixed sheath. One end of the wire is connected to a hood release lever accessible from within the passenger compartment. The opposite end of the cable wire is connected to a spring-loaded hood release latch, which when engaged maintains the hood in its closed position. To release the hood, the operator pulls on the release lever, causing the cable wire to move proportionally. The cable wire pulls the primary latch in opposition to the latch spring, causing the latch to move to an unlocked position and release the hood. A secondary safety catch is typically provided which must then be manually actuated to fully release the hood.

Such remote hood release mechanisms are well-known in the art. However, they suffer from several shortcomings. In particular, the snap-fit fastener which holds the control cable in a fixed position may become disengaged from the hood latching mechanism due to excessive shock or vibration, such as from a frontal impact to the vehicle resulting from a collision, thereby actuating the hood release or otherwise rendering the hood release ineffective. Prior attempts to overcome this shortcoming include the addition of a secondary clamp to act directly against the cable sheath to maintain the snap-fit fastener in its slotted position. This mechanism is described in U.S. Pat. No. 4,585,258 issued to Mochida. However, such clamping mechanisms require additional tools and labor to install, increasing the manufacturing cost of the automobile and causing greater difficulty in replacing a worn or broken control cable. In addition, the rigid nature of clamping-type retainers can cause excessive pressure on the sheath, thus restricting the movement of the enclosed cable wire. Clamping-type retainers may also cause deformation of the control cable upon impact during an automobile collision, binding the movement operation of the hood release.

It should be noted that the prior art may provide sufficient protection to prevent unintentional release of the hood latch. However, additional protection against loss of hood release operability may be a desired convenience option in some instances. It is further desirable to utilize a structure that requires no special tools or added labor to install.

SUMMARY

It is an object of the present invention to provide a system for restraining a hood release cable and preventing inadvertent disengagement of the control cable from a hood release latch resulting from excessive shock or vibration, such as during a collision.

It is a further object of the present invention to provide a system for restraining a hood release cable that does not require the use of tools or additional labor.

Briefly described, these and other objects of the present invention are accomplished by the addition of a retainer having a cable confronting flange spaced-apart from the hood release mechanism. A cable mounting cavity such as a hole or slot for receiving a conventional snap-fit cable-fastener is located in a latch support structure of the hood release mechanism. A retainer is provided at the cable side of the latch support structure and positioned such that a flange portion of the retainer is positioned at a predetermined distance and offset from the mounting cavity. The flange of the spaced-retainer preferably further includes a retaining cavity such as a slot which is situated such that the radius of the retaining cavity is in an opposing, offset position in relation to the mounting cavity. The control cable, having a snap-fit fastener near its end, is manipulated around the flange, and after connecting the cable wire to the latch release lever in any number of conventional manners, the snap-fit fastener is pressed into the cable mounting cavity of the latch support structure. In accordance with the present invention, if the latch support structure is deformed or repositioned during a frontal vehicle impact, the retaining cavity of the flange is designed to come into contact with the control cable. The retaining cavity is designed to impede the snap-fit fastener from disengaging from the latch support structure, thus preventing the vehicle hood from inadvertently opening or loss of the ability to actuate the hood release.

Further features of the inventive embodiments will become apparent to those skilled in the art to which the embodiments relate from reading the specification and claims, with reference to the accompanying drawings.

DESCRIPTION OF THE PREFERRED EMBODIMENT(S)

Figure 1:
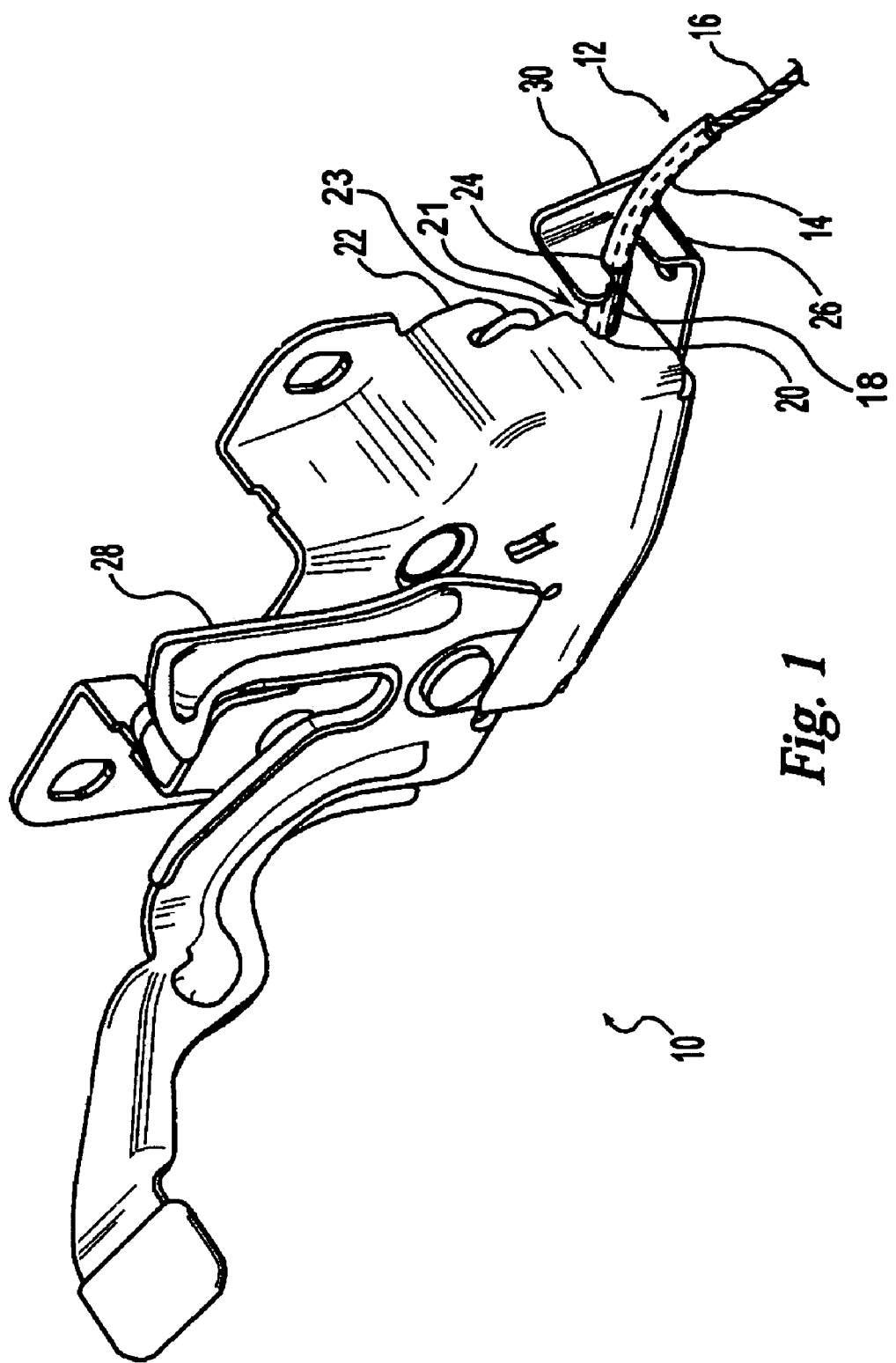
FIG. 1 is a perspective view of the spaced-apart hood latch cable retaining system according to the present invention.
Figure 2:
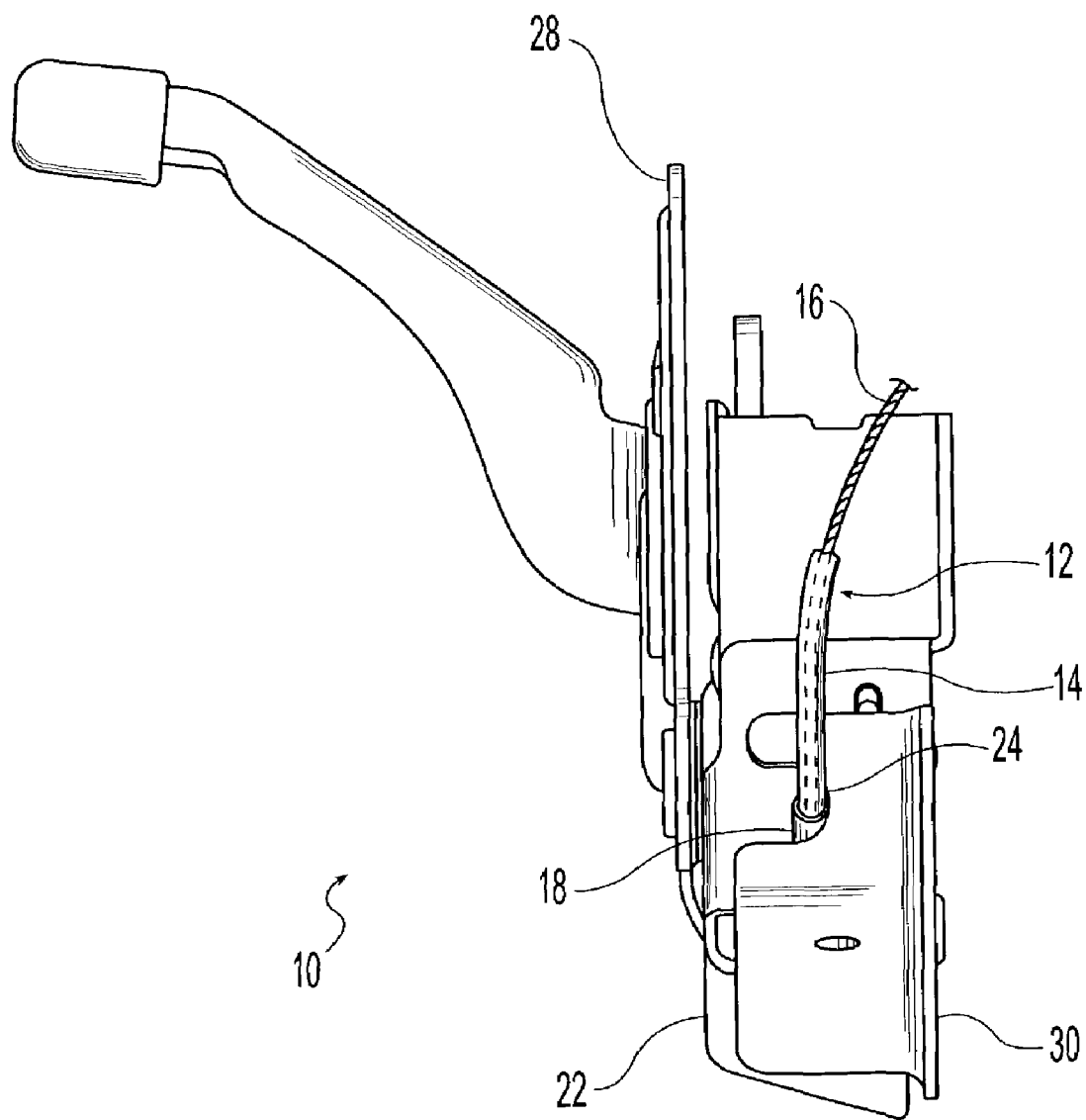
FIG. 2 is a side view of the spaced-apart hood latch cable retaining system according to the present invention.
Figure 3:
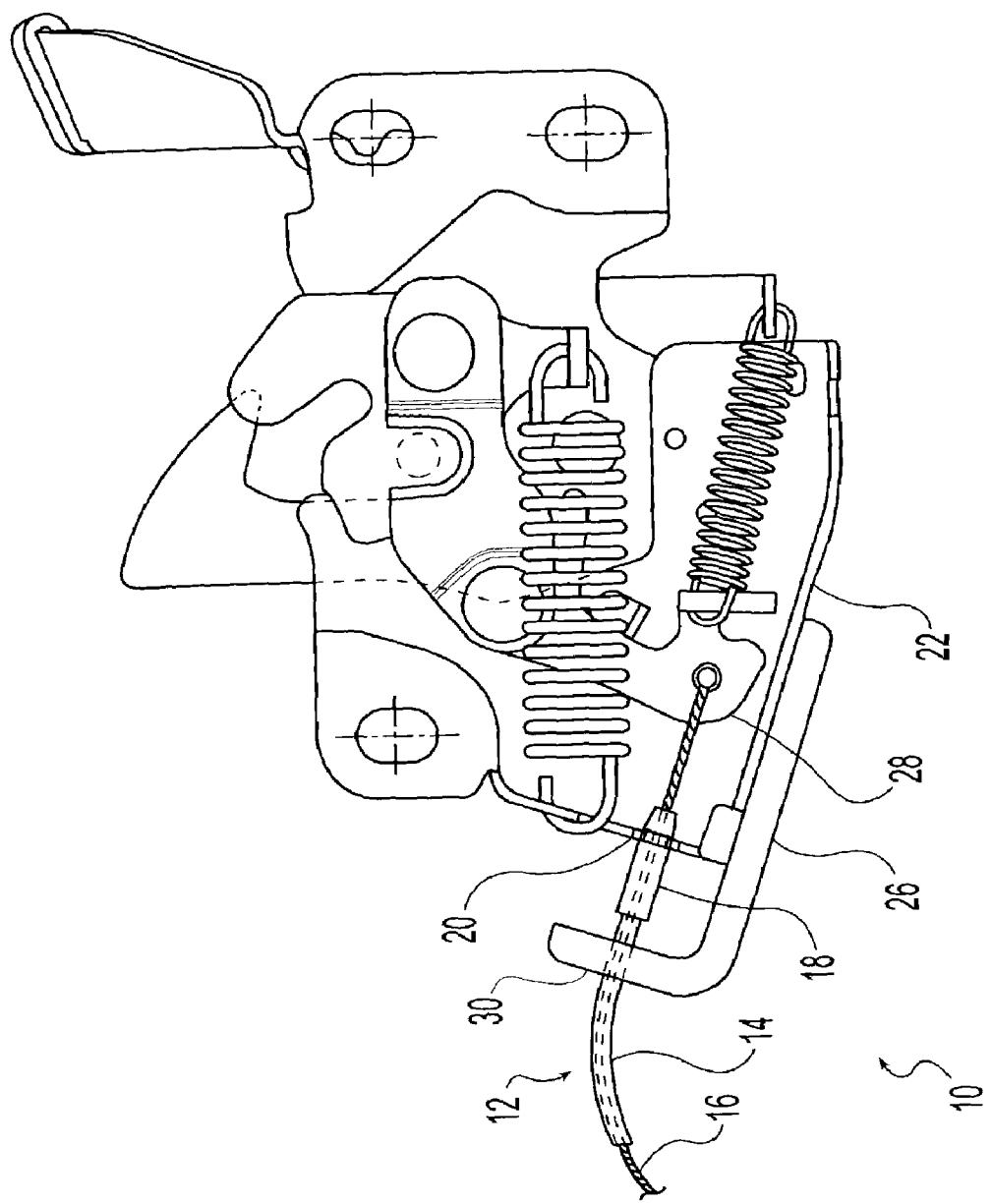
FIG. 3 is a rear view of the spaced-apart hood latch cable retaining system according to the present invention.

Referring to FIGS. 1–3, a spaced-apart hood latch cable retaining system 10 is shown. A latch support structure 22 is located near one end of a motor compartment within a vehicle. A control cable 12 having a sheath 14, a cable wire 16, and a snap-fit, compression-type fastener 18 is placed such that the snap-fit fastener is installed into a cable receiving mounting cavity 20, such as a hole or slot, of the latch support structure 22. The snap-fit fastener 18 is configured such that it expands into the mounting cavity 20 to compressingly hold the sheath 14 in place. The control cable 12 is laterally manipulated so that it is routed past a flange 30 of a retainer 26. The flange 30 of the retainer 26 preferably includes a retaining cavity 24, such as a rectangular or rounded slot but may also be provided with a "confronting edge." The confronting edge may be any regular or irregular surface, such as a tab, an angled surface, or a notch oriented in opposition to the opening of the mounting cavity 20 and effective to retain the control cable 12. The retaining cavity 24 is spaced apart from the cable mounting cavity 20 and is offset from the cable mounting cavity such that a slight bending of the control cable 12 is required in order to route it through the retaining cavity of the flange 30. Upon connection of the cable wire 16 to a latch mechanism 28, the snap-fit fastener 18 is then pressed into the mounting cavity 20 to fix the control cable 12 in place. The retaining cavity 24 may or may not contact the control cable 12 under normal vehicle conditions.

In the event of certain frontal impacts to the vehicle including, without limitation, full-width frontal impacts and frontal offset impacts of low to moderate force, the latch support structure 22 may be deformed or repositioned, which can cause the snap-fit fastener 18 to be disengaged from the mounting cavity 20. This pushing action can, under some circumstances, cause the vehicle's hood to be inadvertently released. The flange 30 may notably decrease the possibility of an inadvertent release of the hood during a frontal vehicle impact by virtue of the retaining cavity 24 coming into contact with the control cable 12 if the latch support structure 22 is deformed or repositioned. The retaining cavity 24, contacting the control cable 12, restrains the control cable and impedes the snap-fit fastener 18 from disengaging the mounting cavity 20.

It should be noted that the captive radius of the retaining cavity 24 should be positioned in opposition to the mounting cavity 20. This will position the flange 30 to oppose forces present during a frontal vehicle impact which would tend to push the snap-fit fastener 18 out of the mounting cavity 20.

While this invention has been shown and described with respect to a detailed embodiment thereof, it will be understood by those skilled in the art that various changes in form and detail thereof may be made without departing from the scope of the claims of the invention.

What is claimed is:

1. A hood latch cable retaining system for a vehicle, comprising:
    a control cable comprising a sheath, a cable wire, and a snap-fit fastener;
    a latch support structure having a cable mounting cavity, the mounting cavity having an opening contiguous to an outside edge of the latch support, said opening being laterally engageable and shaped to receive and captively retain said snap-fit fastener when engaged with the mounting cavity; and
    a stationary retainer member connected to and extending from the latch support structure, the retainer member having a flange with a retaining cavity contiguous to an edge and spaced apart from and oriented substantially parallel to said latch support structure and positioned such that the retaining cavity of the flange is mounted in opposition to the opening of the mounting cavity, effective to restrain the control cable from substantially transverse movement during a frontal vehicle impact, thus maintaining engagement of the snap-fit fastener within the cable mounting cavity.

2. The hood latch cable retaining system of claim 1 wherein said retaining cavity has a radius.

3. The hood latch cable retaining system of claim 1 wherein said cable mounting cavity is a slot.

4. A hood latch cable retaining system for a vehicle, comprising:
    a control cable comprising a sheath, a cable wire, and a snap-fit fastener;
    a latch support structure having a cable mounting cavity, the mounting cavity having an opening contiguous to an outside edge of the latch support, said opening being laterally engageable and shaped to receive and captively retain said snap-fit fastener when engaged with the mounting cavity; and
    a stationary retainer member connected to and extending from the latch support structure, the retainer member having a flange with a confronting edge spaced apart from and oriented substantially parallel to said latch support structure and positioned such that the confronting edge is mounted in opposition to the opening of the mounting cavity, effective to restrain the control cable from substantially transverse movement during a frontal vehicle impact, thus maintaining engagement of the snap-fit fastener within the cable mounting cavity.

5. The hood latch cable retaining system of claim 4 wherein the confronting edge is one of a tab, an angled surface and a notch.

* * * * *